(12) United States Patent
Abou Mahmoud et al.

(10) Patent No.: US 10,171,411 B2
(45) Date of Patent: *Jan. 1, 2019

(54) COMMUNICATION MESSAGE CONSOLIDATION WITH CONTENT DIFFERENCE FORMATTING

(71) Applicant: International Business Machines Corporation, Armonk, NY (US)

(72) Inventors: Alaa Abou Mahmoud, Dracut, MA (US); Paul R. Bastide, Boxford, MA (US); Fang Lu, Billerica, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 15/185,265

(22) Filed: Jun. 17, 2016

(65) Prior Publication Data

US 2016/0380959 A1 Dec. 29, 2016

Related U.S. Application Data

(63) Continuation of application No. 14/747,128, filed on Jun. 23, 2015, now Pat. No. 9,923,862.

(51) Int. Cl.
*G06F 15/16* (2006.01)
*H04L 12/58* (2006.01)
*H04W 4/12* (2009.01)

(52) U.S. Cl.
CPC .............. *H04L 51/36* (2013.01); *H04L 51/06* (2013.01); *H04L 51/16* (2013.01); *H04W 4/12* (2013.01); *H04L 51/14* (2013.01)

(58) Field of Classification Search
CPC ............................... H04L 51/16; H04L 51/06
See application file for complete search history.

(56) References Cited

U.S. PATENT DOCUMENTS

| 7,844,604 | B2 | 11/2010 | Baio et al. |
| 8,225,219 | B2 | 7/2012 | Edelen et al. |
| 8,495,105 | B2 | 7/2013 | Campbell et al. |
| 8,594,465 | B2 * | 11/2013 | Karlov ................. H04N 19/117 382/162 |
| 8,914,331 | B2 | 12/2014 | Kawai et al. |
| 2007/0185871 | A1 | 8/2007 | Canright et al. |

(Continued)

OTHER PUBLICATIONS

United States Patent and Trademark Office, Office Action for U.S. Appl. No. 14/597,964, dated Jun. 8, 2017, pp. 1-24, Alexandria, VA, USA.

(Continued)

*Primary Examiner* — Nam T Tran
(74) *Attorney, Agent, or Firm* — Lee Law, PLLC; Christopher B. Lee

(57) ABSTRACT

A set of similar messages addressed to a user is detected. Redundantly similar portions of the set of similar messages and a progressive set of differences between the set of similar messages are identified. The set of similar messages are consolidated into a single consolidated message. The single consolidated message includes one version of the redundantly similar portions in association with the progressive set of differences in a sequence and the progressive set of differences formatted differently from the redundant similar portions.

9 Claims, 7 Drawing Sheets

(56) References Cited

U.S. PATENT DOCUMENTS

| | | | |
|---|---|---|---|
| 2009/0210800 A1* | 8/2009 | McCann | H04L 51/16 715/752 |
| 2011/0142071 A1* | 6/2011 | Farrell | H04L 51/16 370/473 |
| 2014/0081925 A1 | 3/2014 | Haeberle et al. | |
| 2014/0172427 A1* | 6/2014 | Liu | H04L 51/32 704/239 |
| 2014/0280640 A1 | 9/2014 | Koehane et al. | |
| 2016/0004761 A1 | 1/2016 | Zhang et al. | |
| 2016/0063011 A1 | 3/2016 | Wehbi et al. | |
| 2016/0104474 A1 | 4/2016 | Bunn et al. | |
| 2016/0173435 A1 | 6/2016 | Abou Mahmoud et al. | |
| 2016/0380956 A1 | 12/2016 | Abou Mahmoud et al. | |
| 2018/0115511 A1 | 4/2018 | Abou Mahmoud et al. | |

OTHER PUBLICATIONS

United States Patent and Trademark Office, Office Action for U.S. Appl. No. 14/747,128, dated Aug. 25, 2017, pp. 1-20, Alexandria, VA, USA.

United States Patent and Trademark Office, Notice of Allowance for U.S. Appl. No. 14/747,128, dated Nov. 8, 2017, pp. 1-8, Alexandria, VA, USA.

United States Patent and Trademark Office, Office Action for U.S. Appl. No. 14/567,964, dated Nov. 15, 2017, pp. 1-13, Alexandria, VA, USA.

United States Patent and Trademark Office, Office Action for U.S. Appl. No. 14/747,128, dated Mar. 2, 2017, pp. 1-23, Alexandria, VA, USA.

Author Unknown, SemanticSim_V06: Semantic Similarity Tools for V0.6 and above, ytex: Clinical NLP, Semantic Similarity, Data Mining, Nov. 17, 2012, pp. 1-5, Published online at: http://code.google.com/p/ytex/wiki/SemanticSim_V06.

IBM, List of IBM Patents or Patent Applications Treated as Related, Applicant Appendix, Jun. 17, 2016, pp. 1-2, the contents of which are incorporated herein by reference in their entirety.

IBM, List of IBM Patents or Patent Applications Treated as Related, Applicant Appendix, Mar. 29, 2018, pp. 1-2, the contents of which are incorporated herein by reference in their entirety.

United States Patent and Trademark Office, Advisory Action for U.S. Appl. No. 14/567,964, dated Jan. 31, 2018, pp. 1-4, Alexandria, VA, USA.

IBM, List of IBM Patents or Patent Applications Treated as Related, Applicant Appendix, Aug. 6, 2018, pp. 1-2, the contents of which are incorporated herein by reference in their entirety.

Angela Nguyen, United States Patent and Trademark Office, Office Action for U.S. Appl. No. 14/567,964, dated Jul. 6, 2018, pp. 1-13, Alexandria, VA, USA.

* cited by examiner

COMMUNICATION MESSAGE CONSOLIDATION WITH CONTENT DIFFERENCE FORMATTING

BACKGROUND

The present invention relates to processing of communication messages. More particularly, the present invention relates to communication message consolidation with content difference formatting.

Users of communication devices may generate and send messages to each other. The types of messages users may generate and send include, for example, electronic mail messages ("emails"), text messages, and instant messages.

SUMMARY

A method includes detecting, by a processor, a set of similar messages addressed to a user; identifying redundantly similar portions of the set of similar messages and a progressive set of differences between the set of similar messages; and consolidating the set of similar messages into a single consolidated message comprising one version of the redundantly similar portions in association with the progressive set of differences in a sequence and the progressive set of differences formatted differently from the redundant similar portions within the single consolidated message.

A system that performs the method and a computer program product that causes a computer to perform the method are also described.

DETAILED DESCRIPTION

Figure 1:
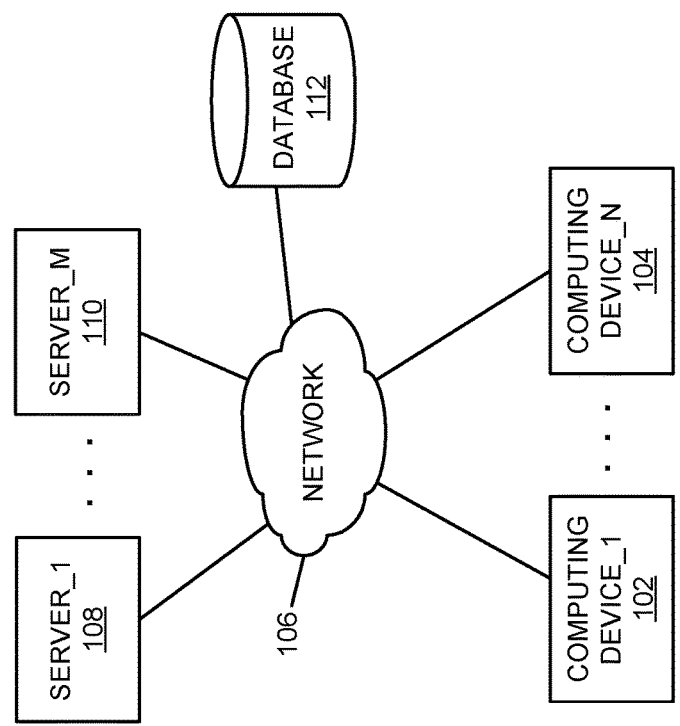
FIG. 1 is a block diagram of an example of an implementation of a system for communication message consolidation with content difference formatting according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides communication message consolidation with content difference formatting. The technology described herein solves a recognized communication messaging problem by providing technology that includes a new form of communication message consolidation that reduces memory and computational processing requirements for communication message storage and transmission bandwidth within complex computing environments. The technology described herein further provides a digest of formatted content differences to identify differences in a recognizable manner. As such, the technology described herein may improve performance of computing devices and network interconnection devices, reduce memory at messaging servers and client devices, and reduce bandwidth that would otherwise be utilized to transmit the unmodified communication messages.

The technology described herein operates by detecting a set of similar messages addressed to a user, either at a messaging server or at a messaging client device. Redundantly similar portions of the set of similar messages and a progressive set of differences between the set of similar messages are identified. The set of similar messages is consolidated into a single consolidated message that includes one version of the redundantly similar portions in association with the progressive set of differences in a sequence within the single consolidated message.

The technology described herein programmatically/automatically compares and analyzes communication messages (e.g., emails, text messages, etc.) that contain similar subject lines and/or content. Communication messages with similar subject lines and/or content are consolidated into a single message with one version of "common content" that is identified across a set of messages, and with progressive differences across the original messages graphically formatted to differentiate the progressive differences. The messaging system user may quickly visualize the change/delta between communication messages by use of the formatted progressive differences. The result further provides reduced processor and storage load at communication servers, reduced bandwidth during message transmission, and reduced storage at client computing devices.

Certain portions of the description below utilize the term "messages" for purposes of example and ease of description. The description below in certain portions also utilizes electronic mail messages (e.g., "emails") for ease of reference. However, it should be understood that the description herein applies at least equally to many additional forms of messaging and communication platforms. For example, text messages, instant messages (IM), short message service (SMS) messages, and other forms of messages may also be processed according to the technology describe herein. In other alternative implementations, the present technology may also be applied to other communication tools, such as online social networking websites where users communicate by use of status updates, message boards, and other forms of messaging. As such, the technology described herein may be implemented in a variety of platforms, and each such variation is considered within the scope of the present technology.

The technology described herein may further be applied at a messaging server device or at a user's messaging client device, as appropriate for a given implementation. When a user account receives new messages (e.g., at a messaging server or at the user's messaging client device), the messages may be compared with other existing messages stored within memory to determine whether there are overlapping strings in either or both of the subject and the content. Comparison of the messages may be configured according to time (e.g., messages received between a certain period of time or over a certain duration of time), may be configured according to a quantity of messages received, or may be configured otherwise as appropriate for a given implementation. Identified similar messages are consolidated into a single message with the progressive differences formatted together as a set. This condensed message with the progressive differences is propagated to the user so that the user receives only one message across the respective predefined time period or pursuant to the configured quantity of messages received, which as described above reduces processing requirements, bandwidth for transmission, and storage requirements both at servers and at the user's messaging client device.

Message consolidation and progressive difference marking/formatting may also be configured to collect a separate quantity of different strings within the message content based upon the configured setting(s). For example, a group of messages that have ten (10) different strings may be formed into a consolidated message, or a group of messages that have twenty (20) different strings in the content may be formed into a consolidated message, each according to the configuration. The threshold number of string differences may be configured as a difference threshold for message processing. Once a group of messages that have similar content are identified, the messages may be compared to identify the configured threshold of differences for consolidation of the respective messages and formatting of the progressive set of differences. For purposes of the description herein, the progressive set of differences is alternatively referred to as a "difference thread" formed from multiple discrete elements of content from multiple original messages. As such, the difference thread spans multiple original messages and the difference thread is consolidated within the single message that is stored and/or transmitted, and ultimately delivered to the user.

Regarding consolidation of messages and formatting of identified progressive content differences, the different messages may be compiled together by displaying the common text in a "regular" message text color, while displaying the delta (e.g., changes) across different messages in one or more different fonts, sizes, and/or colors. Many possibilities for differentiating the delta across different messages are possible, and all such possibilities are considered to be within the scope of the technology described herein.

As a result, a user may be presented with one single compiled message with distinguished content prominently identified for ease of review. This consolidated message captures the redundant/common text from selected messages into a minimized form relative to the repetitive quantity of text required across all of the consolidated messages, and shows the text that is different among different emails in the configured different color, size, and/or font.

A timestamp may also be associated with each difference/delta entry of the progressive text differences within the consolidated message. The timestamp may further assist with determining the time across which the different original messages were sent and/or processed.

The technology described herein may also be configured with available review-time thresholds that may be utilized to programmatically determine what level of details the user will see depending upon how much time the user has to process inbox messages. For example, where the user only has five (5) minutes to process one hundred (100) messages, a configured available review-time threshold of five (5) minutes may be used to generate a consolidated message that has only certain key portions of the available differences highlighted (e.g., highlight five (5) key differences across the one hundred (100) messages). If the user has a longer available time, such as ten (10) minutes to process the one hundred (100) emails, then a configured available review-time threshold of ten (10) minutes may be used to generate the summarized consolidated message to further include an additional set of key differences (e.g., highlight five (5) more key differences for a total of ten (10) key differences across the one hundred (100) messages). The available review-time threshold may be selectable within a messaging user interface by the user, and the user may change the available review-time threshold in real time while reviewing a consolidated message to vary the highlighting of key differences while reviewing a particular consolidated difference message that warrants more-detailed or less-detailed review.

The term "difference thread" as defined herein represents a consolidated/constructed thread of differences that are identified, extracted, and accumulated programmatically across several different communication messages. An example of a difference thread includes individual test result differences that are reported individually across several messages generated as part of a test sequence for a particular system under test. These individual test results, when consolidated as described herein, represent a constructed difference thread.

As also described herein, "common text" refers to text that is either identical or similar across multiple communication messages. The common text may include headers, greetings, salutations, and other text that recurs at different locations within the threaded communication message without significant differentiation of the information presented across the set of messages.

The constructed difference thread may be uniquely and differently formatted from other common text to differentiate the constructed difference thread content at each progressive step of the consolidation of the communication messages over time. The formatted difference thread may then be combined as a unit/set with one version of the common text that recurs across the threaded communication message to form a unique new consolidated message that represents the common text succinctly and that distinguishes the formatted difference thread so that differences across the set of communication messages may be readily distinguished by the user, such as within a single consolidated view, while preserving the common text for context usable to interpret the content of the difference thread.

It should be noted that conception of the present subject matter resulted from recognition of certain limitations associated with communication system messaging. For example, it was observed that a user of a messaging program, such as an email program, often receives too many emails that contain repetitive and very similar/common content with only minor updates/changes from the previous similar emails. It was observed that this large number of similar emails with only minor changes unnecessarily consumes storage space and processing resources at the email servers, which may require increased user email quotas over time and increased hardware resource requirements for such servers. It was additionally observed that transmission of so many messages with repeated, common content to the end user unnecessarily consumes and wastes bandwidth. It was further observed that this quantity of emails, again with only minor updates and large volumes of common content, unnecessarily consumes memory and processing resources at the user's email or other messaging client computing devices. Further, because of the similarities that often exist within the subject lines of such messages, it was determined that if the user looks at the subject line of the emails, it is difficult for the user to determine what differences are present within the content/body among these different emails. As a result it takes a user considerable time to determine whether any action has been requested from the user, which further compounds the message quota/storage problems. The present subject matter improves communication message processing by reducing resource and processing requirements at mail servers and messaging client computing devices, as described above and in more detail below. As such, improved communication messaging may be obtained through use of the present technology.

The communication message consolidation with content difference formatting described herein may be performed in real time to allow prompt consolidation of communication messages with formatting of progressive content differences to reduce storage/processing and with a benefit of improved usability during message review by messaging system users. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for communication message consolidation with content difference formatting. A computing device_1 102 through a computing device_N 104 communicate via a network 106 with several other devices. The other devices include a server_1 108 through a server_M 110. A database 112 may store information, such as communication messages and consolidated communication, within the system 100.

As will be described in more detail below in association with FIG. 2 through FIG. 7, the computing device_1 102 through the computing device_N 104 and the server_1 108 through the server_M 110 may each provide automated communication message consolidation with content difference formatting. As such, the present technology may be implemented at a user computing device or server device level, or by a combination of such devices as appropriate for a given implementation. A variety of possibilities exist for implementation of the present subject matter, and all such possibilities are considered within the scope of the present subject matter.

The automated communication message consolidation with content difference formatting is based upon analysis of a set of communication messages, identification of similar messages and differences across the similar messages, and formatting of the set of identified similar messages into a single consolidated message with the progressive differences formatted for ease of user review. The automated communication message consolidation with content difference formatting may reduce memory and bandwidth use, and processor utilization in varying degrees according to how the present technology is implemented.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The server_1 108 through the server_M 110 may include any device capable of providing data for consumption by a device, such as the computing device_1 102 through the computing device_N 104, via a network, such as the network 106. As such, the server_1 108 through the server_M 110 may each include a messaging server (e.g., email, text messaging, instant messaging (IM), short message service (SMS), etc.), a social network server, a web server, an application server, or other data server device.

The database 112 may include a relational database, an object database, or any other storage type of device. As such, the database 112 may be implemented as appropriate for a given implementation.

Figure 2:
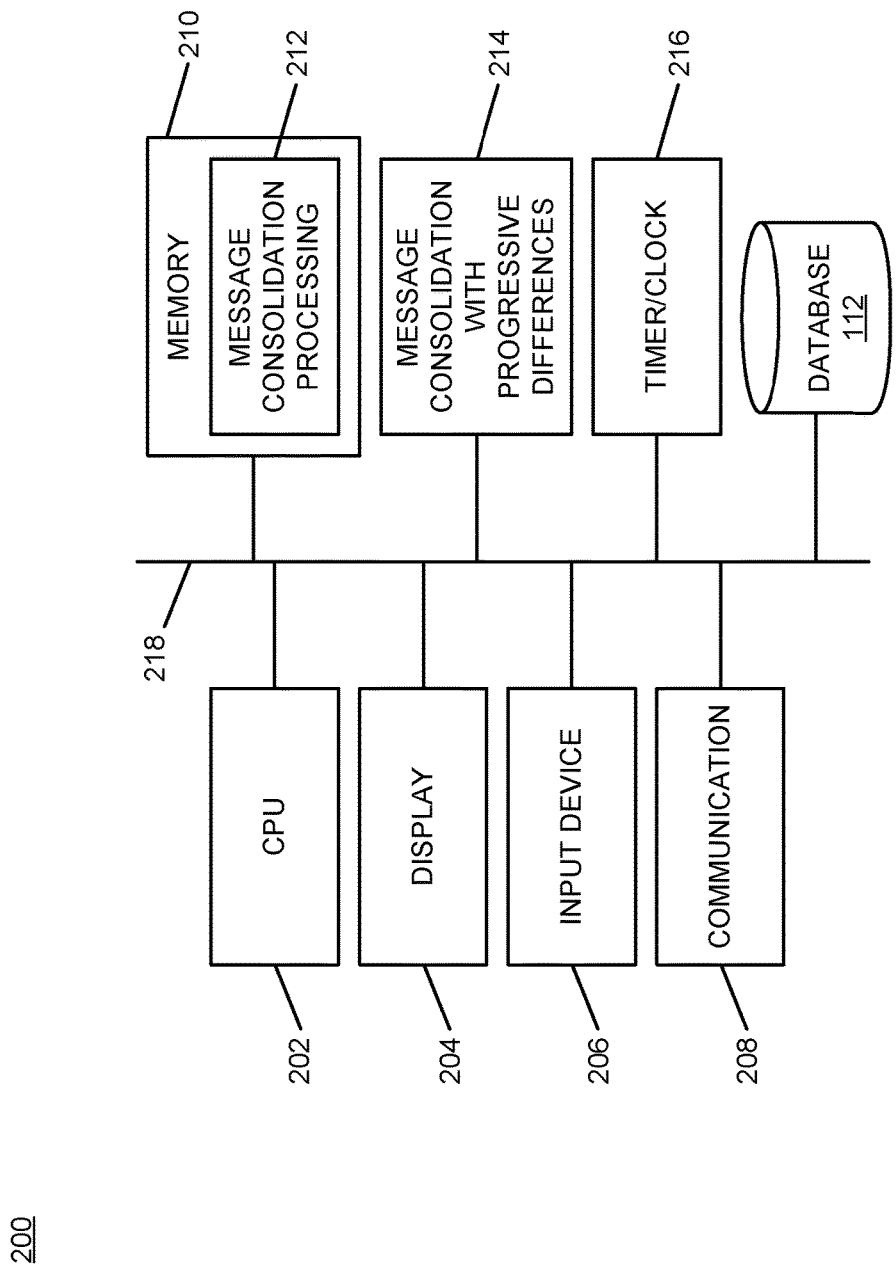
FIG. 2 is a block diagram of an example of an implementation of a core processing module capable of performing communication message consolidation with content difference formatting according to an embodiment of the present subject matter.

FIG. 2 is a block diagram of an example of an implementation of a core processing module 200 capable of performing communication message consolidation with content difference formatting. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of content difference formatting within consolidated communication messages in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback (e.g., for a server-based implementation). However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a message consolidation processing storage area 212 that stores original messages and consolidated messages once processed by the core processing module 200. As will be described in more detail below, consolidated messages stored within the message consolidation processing storage area 212 consume less memory than original sets of messages, consume less bandwidth during transmission, and consume fewer processing resources during review.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A message consolidation with progressive differences module 214 is also illustrated. The message consolidation with progressive differences module 214 provides message set analysis, identification of similarities and differences among analyzed sets of messages, and consolidation of messages with formatted progressive differences for the core processing module 200, as described above and in more detail below. The message consolidation with progressive differences module 214 implements the automated communication message consolidation with content difference formatting of the core processing module 200.

It should also be noted that the message consolidation with progressive differences module 214 may form a portion of other circuitry described without departure from the scope of the present subject matter. Further, the message consolidation with progressive differences module 214 may alternatively be implemented as an application stored within the memory 210. In such an implementation, the message consolidation with progressive differences module 214 may include instructions executed by the CPU 202 for performing the functionality described herein. The CPU 202 may execute these instructions to provide the processing capabilities described above and in more detail below for the core processing module 200. The message consolidation with progressive differences module 214 may form a portion of an interrupt service routine (ISR), a portion of an operating system, a portion of a browser application, or a portion of a separate application without departure from the scope of the present subject matter.

A timer/clock module 216 is illustrated and used to determine timing and date information, such as for use in association with time periods configured to prompt analysis and message consolidation, as described above and in more detail below. As such, the message consolidation with progressive differences module 214 may utilize information derived from the timer/clock module 216 for information processing activities, such as the communication message consolidation with content difference formatting.

The database 112 is again shown within FIG. 2 associated with the core processing module 200. As such, the database 112 may be operatively coupled to the core processing module 200 without use of network connectivity, as appropriate for a given implementation.

The CPU 202, the display 204, the input device 206, the communication module 208, the memory 210, the message consolidation with progressive differences module 214, the timer/clock module 216, and the database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many possible arrangements for components of the core processing module 200 are possible and all are considered within the scope of the present subject matter. It should also be understood that, though the database 112 is illustrated as a separate component for purposes of example, the information stored within the database 112 may also/alternatively be stored within the memory 210 without departure from the scope of the present subject matter. Accordingly, the core processing module 200 may take many forms and may be associated with many platforms.

Figure 3:
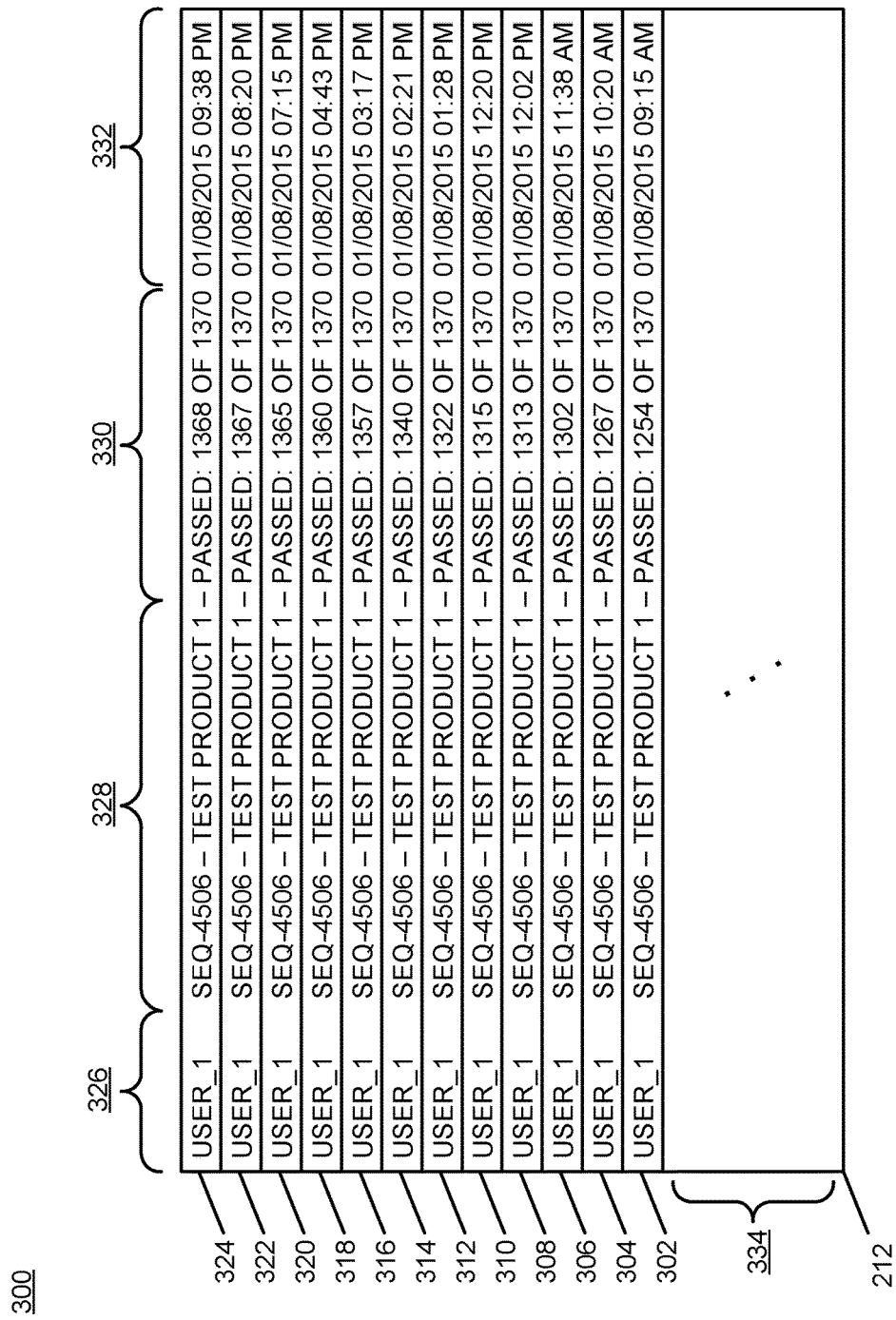
FIG. 3 is a diagram of an example representation of an initial memory state prior to communication message consolidation with content difference formatting according to an embodiment of the present subject matter.
Figure 4:
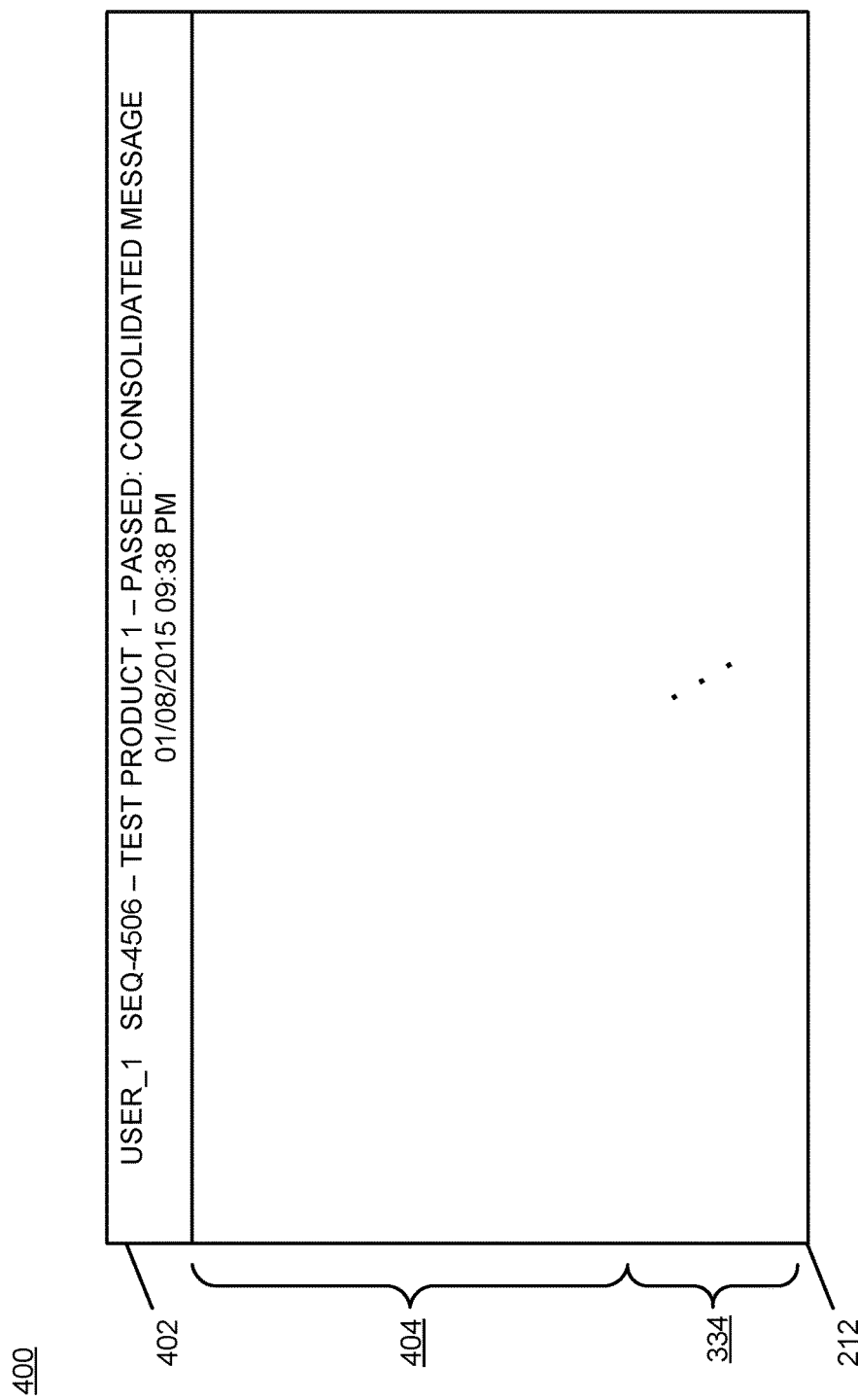
FIG. 4 is a diagram of an example representation of a consolidated memory state after communication message consolidation with content difference formatting according to an embodiment of the present subject matter.

FIG. 3 through FIG. 4 described below represent an example memory improvement sequence that may result by using the techniques described herein, such as within the core processing module 200, to form a consolidated message by use of the communication message consolidation with content difference formatting associated with the present subject matter. The memory representations within FIG. 3 and FIG. 4 are not to any particular drawing scale.

FIG. 3 is a diagram of an example representation of an initial memory state 300 prior to communication message consolidation with content difference formatting. Where message consolidation is performed at a messaging server device, such as one of the server_1 108 through the server_M 110, the initial memory state 300 may represent memory at such a messaging server device. Alternatively, where message consolidation is performed at a messaging client device, such as the computing device_1 102 through the computing device_N 104, the initial memory state 300 may represent memory at such a messaging client device, as appropriate for a given implementation.

The message consolidation processing storage area 212 of the memory 210 is illustrated within FIG. 3 to include several communication messages, each represented within one line by a subject line of the respective communication message. As can be seen from FIG. 3, a message 302, a message 304, a message 306, a message 308, a message 310, a message 312, a message 314, a message 316, a message 318, a message 320, a message 322, and a message 324 all include similar subject lines. For example, each of the messages 302 through 324 includes a user identifier (ID) field 326. Further, each of the messages 302 through 324 include a test identifier (ID) field 328, a test results field 330, and a timestamp field 332 that identifies the date and time of the respective message. These messages 302 through 324 are identified from the first in time to the latest in time based upon the timestamps within the respective timestamp field 332 of each message.

Programmatic analysis of the content of the respective subject lines and/or content of the respective messages may be performed, such as by the message consolidation with progressive differences module 214, to identify similarities and differences between the subject lines and/or content of the communication messages 302 through 324. It should further be noted that additional sequences of messages may be included within a memory area 334, as represented by the angled ellipsis dots. For purpose of the present example, it is assumed that the message consolidation processing storage area 212 is full at one hundred percent (100%) capacity prior to the processing described below with respect to FIGS. 4.

FIG. 4 is a diagram of an example representation of a consolidated memory state 400 after communication message consolidation with content difference formatting. FIG. 4 represents an example consolidated message within memory that may be produced/constructed from the messages described in association with FIG. 3. Where message consolidation is performed at a messaging server device, such as one of the server_1 108 through the server_M 110, the consolidated memory state 400 may represent memory at such a messaging server device. Alternatively, where message consolidation is performed at a messaging client device, such as the computing device_1 102 through the computing device_N 104, the consolidated memory state 400 may represent memory at such a messaging client device, as appropriate for a given implementation.

As can be seen from FIG. 4, a single consolidated message 402 is illustrated as having been created that replaces all of the messages 302 through 324 described above in association with FIG. 3. Though as noted above the memory representations within FIG. 3 and FIG. 4 are not drawn to any particular drawing scale, the relative proportions of message sizes are intended to illustrate that the single consolidated message 402 may consume marginally more memory than any one of the individual messages 302 through 324, but that a relatively large memory free area 404 results from the communication message consolidation with content difference formatting described herein. As such, memory reduction for both storage and transmission, and bandwidth reduction are possible by use of the present technology.

Individual fields within the subject line of the single consolidated message 402 are not separately identified, though it should be noted that the subject line identifies the single consolidated message 402 as a "CONSOLIDATED MESSAGE" to queue a reader that the message has been processed according to the technology described herein, with a timestamp equivalent to the last message 324 of the set of messages 302 through 324 that were consolidated.

As described above, the additional sequences of messages included within the memory area 334, as represented again by the angled ellipsis dots, are again illustrated, though details of consolidation processing of those additional sequences of messages is fulfilled by the description above. As such, the technology described herein may identify and process each sequence of similar messages, and may form a single consolidated message from each set of messages, resulting in additional memory and bandwidth improvements.

Figure 5:
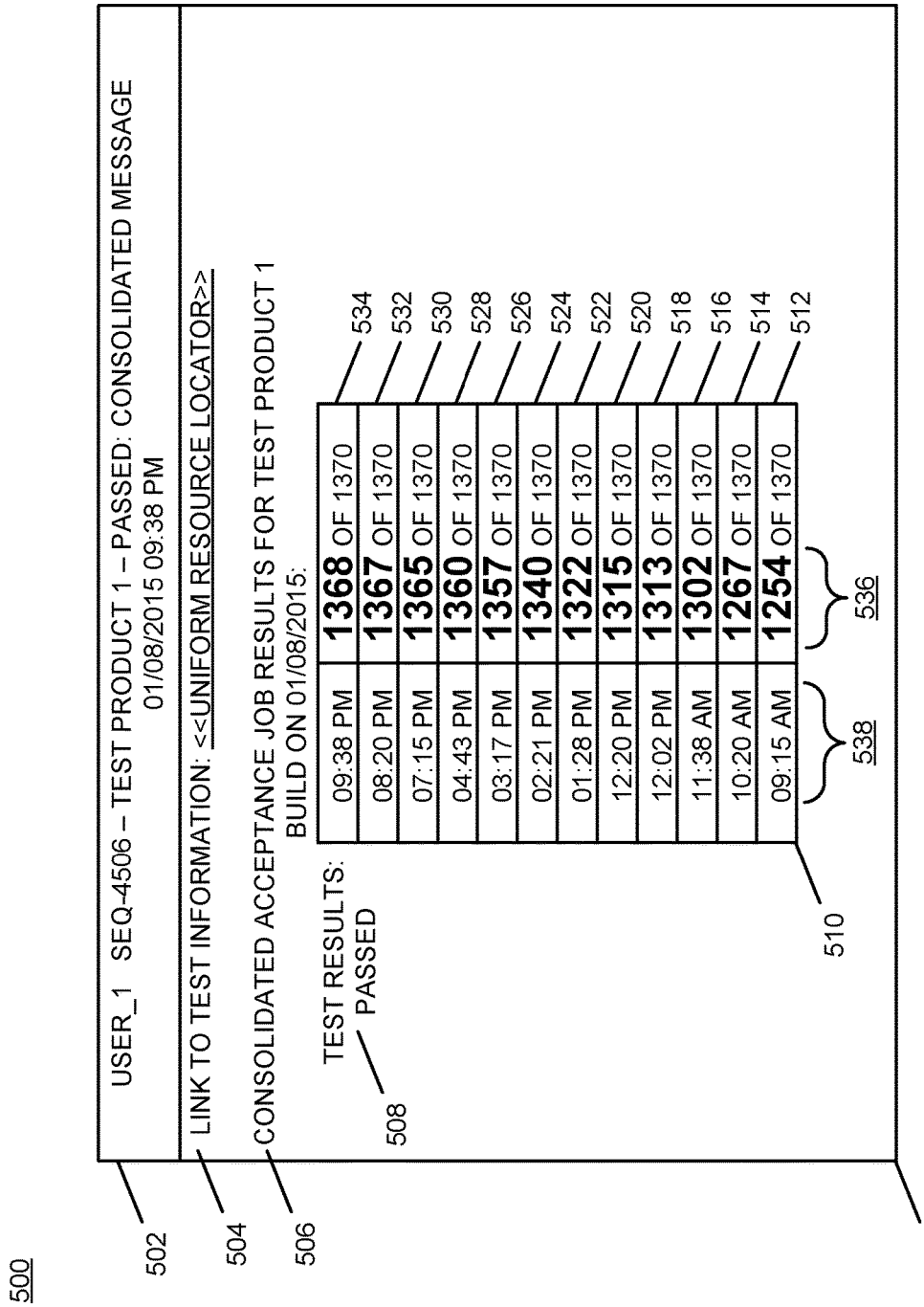
FIG. 5 is a diagram of an example of an illustration of consolidated message content of the consolidated message of FIG. 4 after communication message consolidation with content difference formatting rendered on a display according to an embodiment of the present subject matter.

FIG. 5 is a diagram of an example of an illustration of consolidated message content 500 of the consolidated message 402 of FIG. 4 after communication message consolidation with content difference formatting rendered on a display, such as the display 204. FIG. 5 represents example consolidated message content that may be produced from the messages described in association with FIG. 3, as described above in association with FIG. 4.

Within the consolidated message 402, a consolidated message header 502 is illustrated to include a majority of the redundant information that was included within each similar subject line of the individual messages 302 through 324 described in association with FIG. 3, which can be seen by comparison with FIG. 3. Additionally, the consolidated message header 502 includes the term "CONSOLIDATED MESSAGE" that indicates to the user that the message is a composed message created by the respective computing device to conserve memory, processing, and bandwidth. The consolidated message header 502 also includes the timestamp of the latest message 324 from FIG. 3 that was consolidated into the consolidated message 402. As such, the timestamp of the consolidated message 402 carries forward the timestamp of the last message in the consolidated set of messages.

A link field 504 within the consolidated message content 500 includes a link to test information in the form of a uniform resource locator (URL) for purposes of example. The link field 504 is presumed to have been included within each of the respective messages 302 through 324.

A content summary field 506 further clarifies for the user that the content includes consolidated content (e.g., "CONSOLIDATED"). The content summary field 506 further specifies the particular details that were again redundantly included within each of the respective messages 302 through 324 (e.g., "ACCEPTANCE JOB RESULTS FOR TEST PRODUCT 1" for the "BUILD ON Jan. 8, 2015). A test results field 508 confirms that the consolidated test results represents tests that have passed testing (e.g., "PASSED").

A consolidated difference thread array 510 includes a progressive set of entries 512 through 534. Each of the progressive set of entries 512 through 534 encapsulates content of a respective one of the messages 302 through 324 determined to be different relative to a previous or subsequent message across the set of messages.

A first identified difference thread 536 represented within the progressive set of differences 512 through 534 is illustrated as a column of data that is formatted differently from redundant text from the set of messages 302 through 324 that has been reproduced once within the consolidated message content 500. The difference thread 536 is also illustrated to be formatted differently from redundant text illustrated within the progressive set of entries 512 through 534 (e.g., "OF 1370"). This latter redundant text is provided within the present example within the consolidated difference thread array 510 to assist a user with review of the difference, and may be omitted or moved outside of the consolidated difference thread array 510 as appropriate for the given implementation.

For purposes of example, the formatting of the difference thread 536 is bolded and produced in a larger font relative to other redundant text. However, it should be noted that underlining, different coloration of fonts, and other forms of distinction to allow a user to rapidly review the difference thread may be utilized as appropriate for the given implementation. As such, many possibilities exist for distinguishing progressive differences across a consolidated set of messages, and all such possibilities are considered within the scope of the present technology.

As can also be seen from FIG. 5, each of the progressive set of differences 512 through 534 includes the timestamp of the respective original message 302 through 324. Inclusion of the original message timestamps allows time correlation of the set of messages that have been consolidated. It should be noted that the different timestamps also represent an additional difference thread 538 that was identified across the set of consolidated messages 302 through 324. For purposes of example, and to illustrate flexibility of implementation of the present technology, the timestamps within this second difference thread 538 are not distinguished by different text formatting. However, this separate difference thread 538 may be formatted differently from the redundant text within the body of the consolidated message content 500, and may further be formatted differently from the difference thread 536 (e.g., by use of underlining, or color variations, etc.).

As such, a user may configure the granularity and types of difference threads that may be formatted differently from redundant text, and relative to other sets/threads of differences. Additionally, multiple sets of progressive differences between different text strings within a given set of similar communication messages may be identified, and consolidation of the different progressive sets of progressive differences may be categorized within a single consolidated communication message. Further, as described above, the number of differences may be configured according to a quantity of time a user has to review consolidated messages, and may be dynamically adjusted by the user during review if a particular difference thread is of interest. These aspects of flexibility provide improved usability of the communication message consolidation with content difference formatting described herein.

Figure 6:
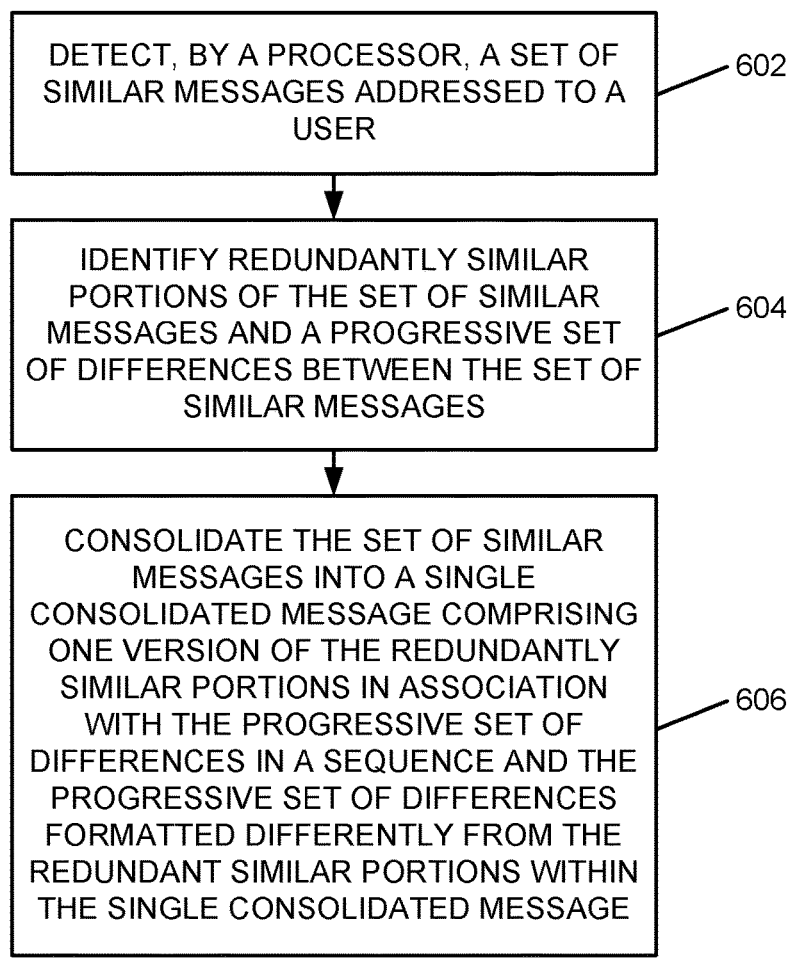
FIG. 6 is a flow chart of an example of an implementation of a process for communication message consolidation with content difference formatting according to an embodiment of the present subject matter.
Figure 7:
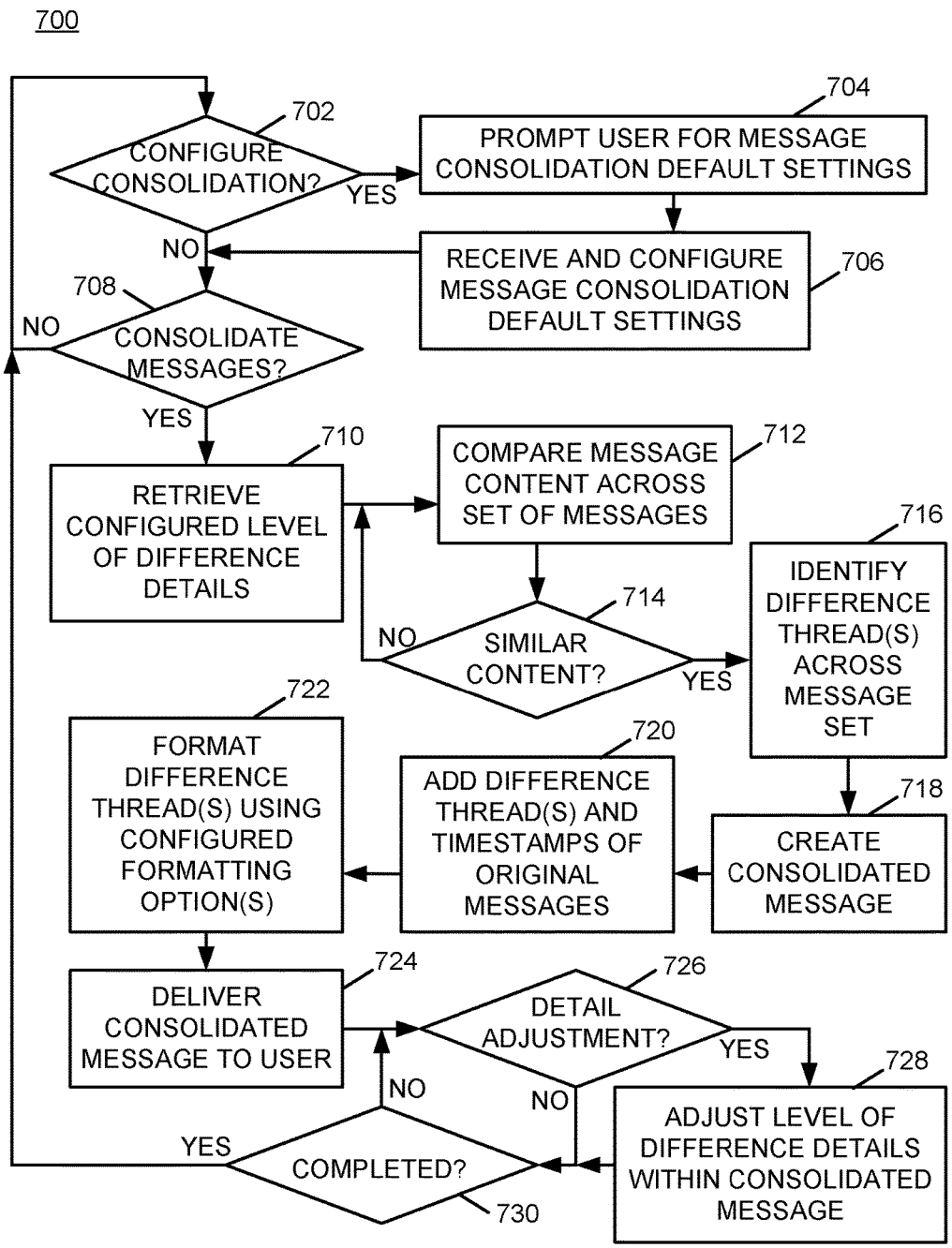
FIG. 7 is a flow chart of an example of an implementation of a process for communication message consolidation with content difference formatting that includes message consolidation configuration and additional message consolidation processing details according to an embodiment of the present subject matter.

FIG. 6 through FIG. 7 described below represent example processes that may be executed by devices, such as the core processing module 200, to perform the automated communication message consolidation with content difference formatting associated with the present subject matter. Many other variations on the example processes are possible and all are considered within the scope of the present subject matter. The example processes may be performed by modules, such as the message consolidation with progressive differences module 214 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 6 is a flow chart of an example of an implementation of a process 600 for communication message consolidation with content difference formatting. The process 600 represents a processor-implemented method of performing the communication message consolidation with content difference formatting described herein. At block 602, the process 600 detects, by a processor, a set of similar messages addressed to a user. At block 604, the process 600 identifies redundantly similar portions of the set of similar messages and a progressive set of differences between the set of similar messages. At block 606, the process 600 consolidates the set of similar messages into a single consolidated message comprising one version of the redundantly similar portions in association with the progressive set of differences in a sequence and the progressive set of differences formatted differently from the redundant similar portions within the single consolidated message.

FIG. 7 is a flow chart of an example of an implementation of a process 700 for communication message consolidation with content difference formatting that includes message consolidation configuration and additional message consolidation processing details. The process 700 represents a processor-implemented method of performing the communication message consolidation with content difference formatting described herein. At decision point 702, the process 700 makes a determination as to whether a request to configure communication message consolidation has been detected. For example, a request to configure communication message consolidation may be detected in response to a user request to establish parameters, as described above and in more detail below, for user-specific communication message consolidation preferences.

In response to determining that a request to configure communication message consolidation has been detected, the process 700 prompts the user for message consolidation default settings (e.g., parameters) at block 704. For example, as described above, default settings/parameters may be specified for a default level of difference details to be presented within a consolidated communication message, a consolidated message count threshold usable as an event to invoke processing to consolidate messages, one of more consolidation time periods/frequencies usable as events to invoke processing to consolidate messages, categories of difference threads and formatting options for each specified category of difference thread (e.g., a content difference thread category, a timestamp difference thread category, etc.), and other default settings/parameters as appropriate for a given implementation.

At block 706, the process 700 receives and configures message consolidation default settings (e.g., parameters) as specified by a user to provide user-specific communication message consolidation preferences. For example, the process 700 may configure a level of difference details of a progressive set of differences that are viewable by the user depending upon how much time is available to the user to process the messages. The process 700 may also configure different events that may be utilized to invoke processing to consolidate messages, as appropriate for the user's preferences and the particular implementation, such as configuring a message consolidation time period.

In response to receiving and configuring message consolidation default settings at block 706 or in response to determining that a request to configure communication message consolidation has not been detected at decision point 702, the process 700 makes a determination at decision point 708 as to whether an event to invoke processing to consolidate messages has been detected. Events that may be utilized to invoke processing to consolidate messages may include any of the configured user-specific communication message consolidation preferences described above (e.g., a consolidated message count threshold, one of more message consolidation time periods/frequencies, etc.). In response to determining at decision point 708 that an event to invoke processing to consolidate messages has not been detected, the process 700 returns to decision point 702 and iterates as described above.

In response to determining at decision point 708 that an event to invoke processing to consolidate messages has been detected, the process 700 retrieves a configured level of difference details for the respective user at block 710. At block 712, the process 700 compares message content across a set of messages to identify similarities and differences between the subject lines and content of the respective messages. The set of messages may include a set of messages that match a configured consolidated message count threshold, as described above.

At decision point 714, the process 700 makes a determination as to whether similar content has been identified across the set of messages. In response to determining that similar content has not been identified across the set of messages, the process 700 returns to block 712 and continues evaluation and comparison of message content across a set of messages to identify similarities and differences between subject lines and content of the respective messages.

In response to determining at decision point 714 that similar content has been identified across the set of messages, the process 700 identifies one or more difference threads across the message set at block 716. For example, the process 700 may extract elements from the set of messages that represent a progressive set of differences, and may form a difference thread from the extracted elements in the progressive set of differences. The process 700 may also identify redundantly similar portions of the set of similar messages, and may identify a progressive set of differences in accordance with a configured level of difference details. The progressive set of differences between the set of similar messages may include identifying messages received during a configured message consolidation time period. The process 700 may also identify multiple different progressive sets of differences between different text strings within the set of similar messages.

At block 718, the process 700 creates a consolidated message. Creating the consolidated message may include consolidating the set of similar messages into a single consolidated message that includes one version of the redundantly similar portions.

At block 720, the process 700 adds the difference thread(s) and timestamps of the original messages to the consolidated message. As such, the process 700 consolidates the set of similar messages into a single consolidated message that includes one version of the redundantly similar portions in association with the one or more progressive sets of differences in a sequence within the single consolidated message, and adds timestamps of the original messages.

At block 722, the process 700 formats the difference thread(s) using configured difference thread formatting options. As described above, the user may configure different formatting options for different categories of difference threads (e.g., a content difference thread category, a timestamp difference thread category, etc.). As such, the process 700 may utilize the configured formatting options to format one or more difference threads that have been identified. Formatting may further include highlighting each difference within the progressive set of differences in the sequence within the single consolidated message in a different color relative to the one version of the redundantly similar portions, and may include use of different fonts, different font sizes, underlining, and other text features as appropriate for the given implementation.

At block 724, the process 700 delivers the consolidated message to the user. For example, where the process 700 is operating at a messaging server device, the consolidated message may be delivered to the user by delivery to the user's inbox responsive to a user client messaging application requesting new messages. Within this implementation bandwidth may be conserved by delivery of the single consolidated message to the user. Alternatively, where the process 700 is operating at a messaging client device, the consolidated message may be delivered to the user by updating the user's inbox. Within this implementation memory use may be reduced by consolidation of the several different messages and delivery of the single consolidated message to the user.

At decision point 726, the process 700 begins iteratively determining whether a level of detail adjustment has been detected as being requested by the user. For example, the user may determine that a given difference thread is of interest or may determine that the user has more time to view the particular difference thread relative to the default configured level of difference details. In response to determining that a level of detail adjustment has been detected as being requested by the user, the process 700 adjusts the level of difference details within the consolidated message at block 728. Adjustment of the level of difference details may include formulation of a new difference thread that includes more difference details, may include promotion of difference details beyond the configured or selected level of difference details that may have been previously filtered from view within the content of the consolidated message, or may be implemented otherwise as appropriate for the particular implementation and location where the message consolidation of the process 700 is being performed.

In response to either adjusting the level of difference details within the consolidated message at block 728, or in response to determining at decision point 726 that a level of detail adjustment has not been detected as being requested by the user, the process 700 makes a determination at decision point 730 as to whether processing has been completed (e.g., for the particular iteration of message consolidation, etc.).

In response to determining at decision point 730 that processing has not been completed, the process 700 returns to decision point 726 and iterates as described above. In response to determining at decision point 730 that processing has been completed, the process 700 returns to decision point 702 and iterates as described above.

As such, the process 700 provides for configuration and processing of message consolidation options. The process 700 provides dynamic memory, processing, and bandwidth conservation technology associated with messaging environments. The messaging environments within which or in association with which the process 700 may be implemented include a variety of messaging environments, as described above (e.g., email, text messaging, IM, SMS, online social networking websites, etc.). A user may additionally dynamically change difference thread characteristics within consolidated messages during review of a consolidated message.

As described above in association with FIG. 1 through FIG. 7, the example systems and processes provide communication message consolidation with content difference formatting. Many other variations and additional activities associated with communication message consolidation with content difference formatting are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A method, comprising:
    detecting, by a processor, a set of similar messages addressed to a user;
    identifying redundantly similar portions of the set of similar messages that provide contextual details related to a progressive set of differences between the set of similar messages;
    consolidating the set of similar messages into a single consolidated message comprising the redundantly similar portions preserved in association with sequential entries of the progressive set of differences in a sequence as context usable for interpretation of the progressive set of differences, and with the progressive set of differences formatted differently from formatting applied to the redundantly similar portions within the single consolidated message;
    configuring a presentation level of difference details that specifies an amount of content of each of the sequential entries of the progressive set of differences viewable within the single consolidated message by the user depending upon how much time is available to the user to process messages;
    filtering and removing from view, within the single consolidated message, additional content of the sequential entries of the progressive set of differences other than the specified amount of content of each of the sequential entries in accordance with the configured presentation level of difference details; and
    promoting, in response to detecting a level of detail adjustment entered by the user, at least a portion of the additional content of the sequential entries of the progressive set of differences to be viewable within the single consolidated message.

2. The method of claim 1, further comprising:
    configuring a message consolidation time period that specifies a range of time over which to consolidate messages; and
    where consolidating the set of similar messages into the single consolidated message comprises consolidating messages from the detected set of similar messages received during the configured message consolidation time period.

3. The method of claim 1, further comprising:
    identifying a plurality of different progressive sets of differences between different text strings within the set of similar messages; and
    where consolidating the set of similar messages into the single consolidated message comprises categorizing each of the plurality of different progressive sets of differences between the different text strings within the set of similar messages within the single consolidated message.

4. The method of claim 1, where consolidating the set of similar messages into the single consolidated message with the progressive set of differences formatted differently from the formatting applied to the redundantly similar portions within the single consolidated message comprises highlighting each sequential entry of the progressive set of differences in the sequence within the single consolidated message in a different color relative to a color applied to the redundantly similar portions.

5. The method of claim 1, further comprising providing, with each sequential entry of the progressive set of differences within a body of the single consolidated message, an original timestamp of each original message that contained the respective sequential entry of the progressive set of differences.

6. The method of claim 1, further comprising delivering the single consolidated message comprising the redundantly similar portions preserved in association with the sequential entries of the progressive set of differences in the sequence as the context usable for interpretation of the progressive set of differences within the single consolidated message to the user.

7. The method of claim 1, where:
    a configured presentation number of difference details specifies a quantity of the progressive set of differences viewable by the user within the single consolidated message; and
    further comprising:
        detecting the level of detail adjustment entered by the user; and adjusting the quantity of the progressive set of differences viewable by the user within the single consolidated message according to the detected level of detail adjustment.

8. The method of claim 1, where consolidating the set of similar messages into the single consolidated message comprises:
- creating a content difference thread that comprises the sequential entries of the progressive set of differences; and
- adding the content difference thread to a body of the single consolidated message; and further comprising:
- creating a timestamp difference thread that comprises an original timestamp of each original message that contained each respective sequential entry of the progressive set of differences; and
- adding the timestamp difference thread to the body of the single consolidated message, with each original timestamp correlated with the respective sequential entry of the progressive set of differences.

9. The method of claim 1, where the progressive set of differences are selected and consolidated into the single consolidated message according to a configured threshold number of difference strings specified by a consolidated message setting.

\* \* \* \* \*